Jan. 18, 1949.　　　A. E. KREMILLER　　　2,459,326
PULSATOR SYSTEM

Filed Nov. 19, 1945　　　　　2 Sheets—Sheet 1

Inventor
Arthur E. Kremiller
By R. S. Berry
Attorney

Jan. 18, 1949.　　　A. E. KREMILLER　　　2,459,326
PULSATOR SYSTEM

Filed Nov. 19, 1945　　　2 Sheets-Sheet 2

Inventor
Arthur E. Kremiller
By R. S. Berry
Attorney

Patented Jan. 18, 1949

2,459,326

UNITED STATES PATENT OFFICE 2,459,326

PULSATOR SYSTEM

Arthur E. Kremiller, Glendale, Calif., assignor to Adel Precision Products Corp., a corporation of California Application November 19, 1945, Serial No. 629,646

2 Claims. (Cl. 60—54.5)

1

This invention relates to a closed hydraulic system for operating the throttles of aircraft engines or other control mechanisms or elements in aircrafts, ships and the like.

One of the objects of this invention is to provide in a closed hydraulic actuator system certain safety means which in case of the rupture or disconnection of one of the fluid lines as a result of battle damage or other accidental causes, will make possible an operation of the system to move the throttle or other mechanism controlled by the system into a position assuring that the aircraft or ship may be safely operated.

Another object of this invention is to provide a system of the character described in which the throttle or mechanism controlled by the system will be reliably held in any position into which it is moved regardless of vibration and other forces inherent in and externally applied to the system.

A further object is to provide a closed hydraulic system such as described in which the safety and emergency measures are afforded by a predetermined spring load on the piston of the receiver unit which operates the throttle or mechanism controlled by the system, together with a novel two-way resistor valve which counteracts the spring load when the system is static thereby preventing creeping of the receiving piston and assuring that critical adjustments of the system controlled element will be maintained.

Another object is to provide a closed hydraulic system such as described in which a pressure equalizer which has the usual function of providing an initial equal pressure throughout the system, compensating for thermal expansion and contraction, compressing the fluid and acting as a sub-reservoir to supply fluid in case of leakage, also has the function of coacting with the aforesaid safety means to assure reliable performance thereof.

Another object of this invention is to provide a two-way or flow resisting valve of simple and novel construction wherein a single valve member will make possible a controlled flow of fluid in either direction in a fluid line in which the valve is mounted, the said valve member being spring loaded so that it will open only at predetermined fluid pressures, thereby affording a particular flow control which may be desirable in various types of hydraulic systems where resistance to the flow in one or more lines is essential to proper performance of the system.

With the foregoing objects in view, together with such other objects and advantages as may

2 subsequently appear, the invention resides in the parts and the combination, construction and arrangement of parts hereinafter described and claimed, and illustrated by way of example in the accompanying drawings, in which:

As shown in the accompanying drawings a closed hydraulic system embodying the present invention is made up of transmitter or master unit A connected by dual lines B and C with a receiver or slave unit D so that when the piston E of the transmitter unit is shifted upon manipulation of a lever F, fluid will flow through lines B and C and move the piston G of the receiver unit D in the same direction and to the same extent as the piston E. The piston E is adapted to be connected to any mechanism, control or element which is to be operated by the system. As here shown it is connected by means of a lever H and link J to an element K which latter, for example, may be the throttle of an engine in an airplane. A spring L is connected with the lever H and a support M so that it will exert a force tending to move the receiver unit piston G in a direction for moving the element K into a predetermined position. In the case of a throttle this spring will tend to move the throttle into full open position.

A pressurized equalizer and reservoir unit N is connected by lines O and P with the fluid lines B and C respectively and includes a cylinder Q and a dual piston R which are constructed and arranged to provide separate fluid chambers O' and P' with which the lines O and P are connected. Above the piston is an air chamber Q' adapted to be supplied with air through a valved inlet S and to maintain a pressure say of approximately 200 p. s. i. on the piston. The piston R transmits this pressure to the fluid in chambers O' and P', and the lines O, P, B and C, thereby creating an initial pressure in both sides of the closed system. As is customary in closed systems having a pressurized equalizer, the initial pressure in the system provided by the equalizer must be greater than the work load on the receiver unit and said equalizer will act as a reservoir for replacing fluid in case of leakage, compensate for thermal expansion and contraction of the fluid, and at the same time compress the fluid so that a greater nicety of control and reliability of performance are assured.

In accordance with my invention I provide a safety means in the system which includes a flow restricting or flow resisting valve T. Inasmuch as the spring L coacts with this valve in an emergency, such as upon the accidental breaking of one or both of the fluid lines, it may be considered as a part of said safety means. In fact the initial pressure in the system is also a factor assisting this safety means and assuring a reliable performance thereof in case of the breaking of one or both of the fluid lines.

Figures 1, 2, 3, 4:
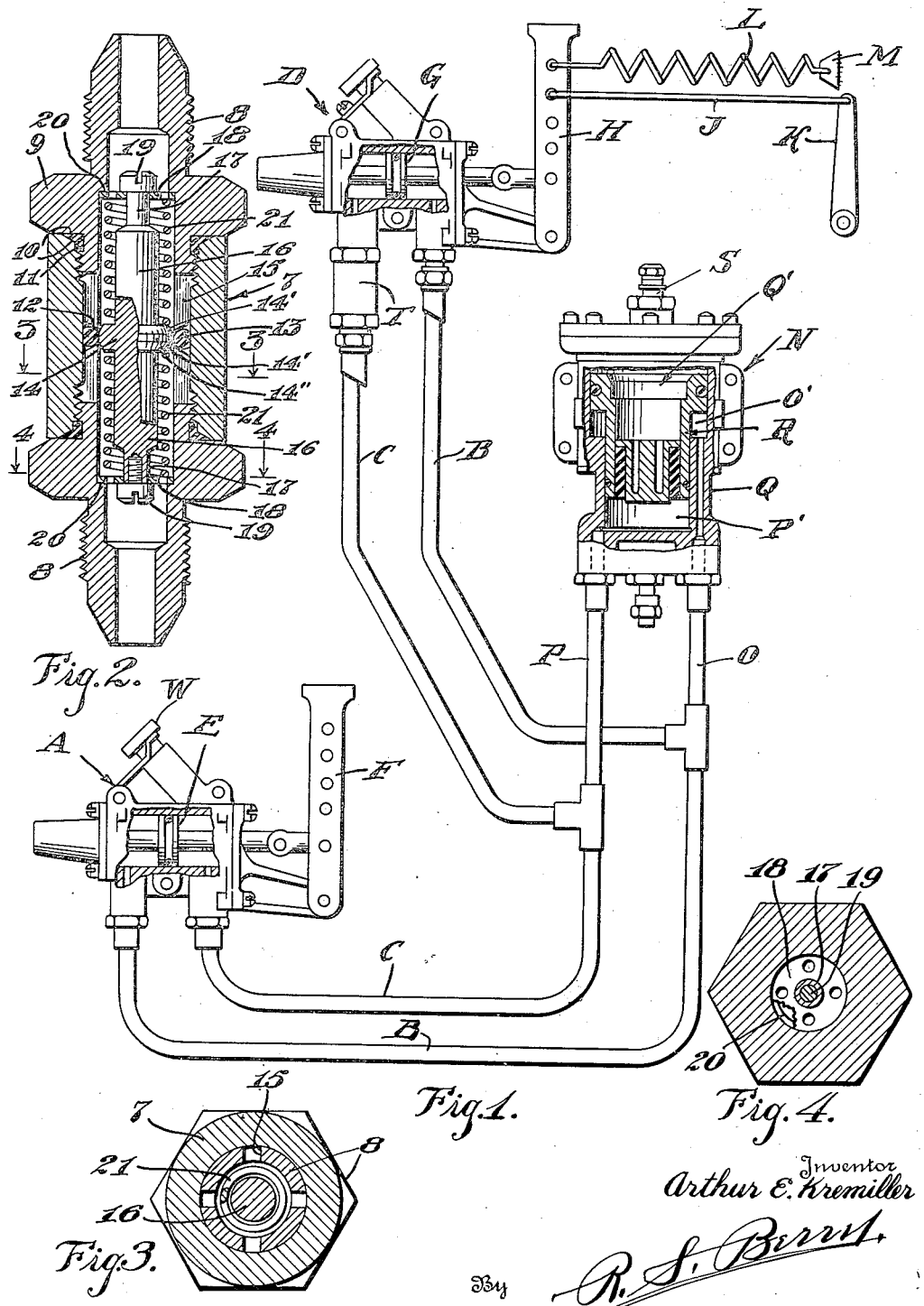
Fig. 1 is a schematic view of a hydraulic system embodying the present invention.
Fig. 2 is a vertical sectional view of the flow restricting valve.
Fig. 3 is a cross sectional view taken on the line 3—3 of Fig. 2.
Fig. 4 is a cross sectional view taken on the line 4—4 of Fig. 2.
Figure 6:
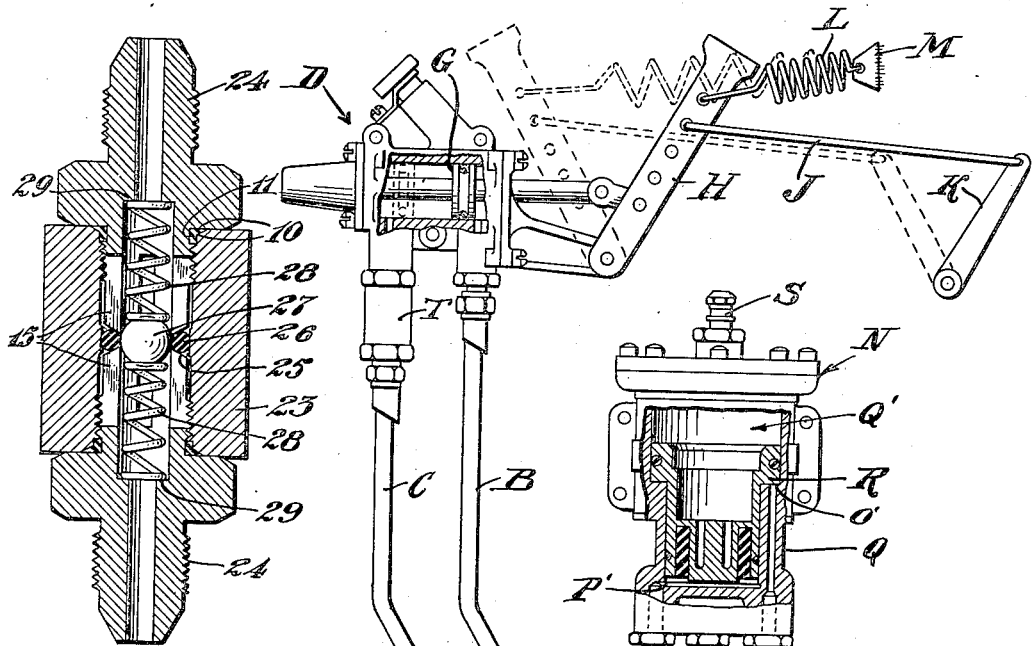
Fig. 6 is a vertical sectional view of a modified form of flow restricting valve.

One form of restrictor or resistor valve is shown in detail in Figs. 2, 3 and 4, and another form is shown in Fig. 6. Either form may be used in the system shown in Figs. 1 and 5 wherein the valve is designated T and connected in the line C preferably adjacent the receiver unit D.

The valve shown in Figs. 2, 3, and 4 comprises a cylindrical body 7 open at both ends for reception of like tubular fittings 8 which are screwed into the ends of the bore of said body. Intermediate their ends these fittings are provided with annular flanges 9 which abut the outer ends of the body. Opposed portions of the flanges and ends of the body have complementary grooves 10 which receive and hold in place sealing rings 11. The outer ends of the fittings 8 are screw threaded to provide for connecting of the valve in the line C.

The inner end portions of the fittings 8 are closely spaced apart within the cylindrical body 7 and beveled as at 12 so as to hold in place an elastic ring 13 of circular cross section which ring constitutes an elastic valve seat for a valve member 14. The inner periphery of the ring 13 protrudes into the bore of the complementary tubular fittings 8 so that it will serve as a seat for the valve member 14 and permit said valve to move to and from seating engagement therewith in either direction. The valve member 14 is beveled as at 14' on opposite sides of a peripheral seating portion 14" so that it may move freely in either direction away from and against said seat. Slots 15 in the inner end portions of the fittings 8 provide for free flow of fluid between the valve member 14 and its seat 13 when the valve member is unseated.

Valve stems 16 of considerably smaller diameter than the bore of the fittings 8 project from opposite sides of the valve member 14 and have reduced free end portions 17 which are slidable through annular and apertured guide disks 18. Screws 19 are mounted on the ends of the portions 17 so that heads thereof act as stops to limit the movement of the stems and the valve member. These disks abut shoulders 20 within the fittings 8 being held thereagainst by means of like springs 21 which surround the stems 16 and abut opposite sides of the valve member 14. These springs hold the valve member centered and seated against the inner periphery of the ring seat 13 but will yield and allow the valve member to become unseated when one side or the other of the valve member is subjected to the working pressure of the system.

The springs 21 are of such strength that they will hold the valve member 14 closed when the pressure on both sides of the valve member is equal within the strength of the springs.

The modified form of resistor valve shown in Fig. 6 comprises a cylindrical body 23, fittings 24, beveled inner ends 25 of the fittings, and an elastic annular valve seat 26 all of the same construction and arrangement as shown in Figs. 2, 3, and 4, but the valve member is of different form, being a ball 27 and held seated within the annular seat by means of a pair of springs 28. These springs abut opposite sides of the ball valve member at their inner ends and abut shoulders 29 at their outer ends. This form of valve operates in the same manner as valve member shown in Figs. 2, 3, and 4.

Assuming that with the system in the condition shown in Fig. 1, the throttle K is half open and it is desired to close the throttle by moving it to the left, the operator moves the lever F of the transmitter unit A to the left. The fluid in this unit is thus forced through line B to the right end of the receiver unit D and therefore moves piston G to the left whereby through the lever H and link J the throttle K is moved to the left. Fluid from the left end of the receiver D is directed to the right end of the transmitter unit A through the line C, the valve member 14 of the resistor valve T being then opened by the pressure of this return fluid.

When it is desired to open the throttle K, that is, move it to the right of the position shown in Fig. 1, the operator moves the lever F to the right and forces fluid through line C to the left end of the receiver unit D thereby moving the piston G to the right and through the lever H and link J moving the throttle to the right. During this operation the valve member 14 in the resistor valve T is opened by the pressure of the working fluid in line C.

It should be noted that wherever the transmitter piston E is stopped the receiver piston G is likewise stopped, the latter always being moved in exact correspondence to the movement of the former. The pistons of these units will in effect be hydraulically locked against movement out of any position into which they are moved upon cessation of operation of the transmitter, due to the presence of the resistor valve T in the line C, thereby assuring that critical adjustments of the throttle K will be reliably maintained. If this restrictor valve were not present in the system the spring load on the slave unit imposed by the spring L would tend to move the pistons of the system as would also vibration and shocks to which the system is subjected from time to time. As the spring load on the valve member 14 of the valve T is greater than that of the spring load of spring L it is seen that the restrictor valve will remain closed when the system is not in operation, in spite of external forces applied to the receiver unit. It being noted that the work load imposed on the receiver unit is less than the initial pressure in the system imposed by the pressurized equalizer N. This initial pressure is equal on both sides of the system as well as on opposite sides of the valve T when the system is inoperative, and as the spring load on said valve is heavier than the spring load on the receiver unit, said valve will remain closed and "hydraulically" lock the moving parts of the closed system as aforesaid. However, at any time that the transmitter unit A is operated the valve member 14 of the valve T will open in one direction or the other depending upon the direction of movement of the transmitter piston E.

Emergency operation

Figure 5:
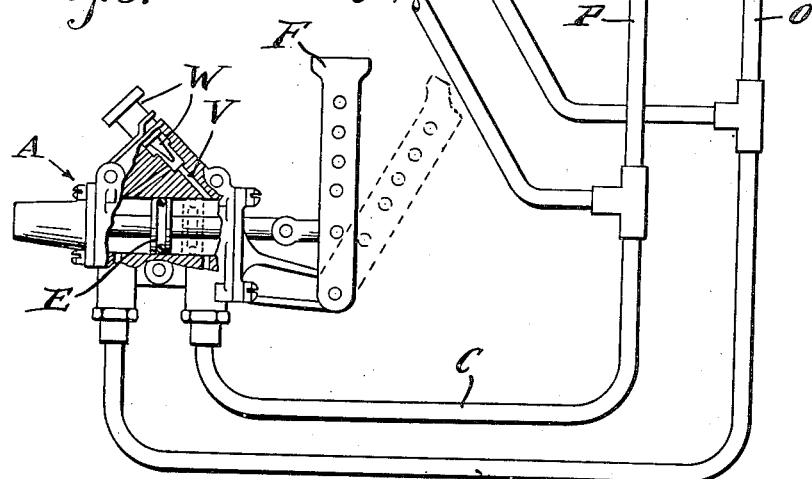
Fig. 5 is a schematic view of the system shown in Fig. 1 showing parts of the system in different operative positions and indicating an accidental break in one of the fluid lines.

Should the line C break, for example as indicated at U in Fig. 5, it being assumed for example that at the time of the break the system is in condition shown in Fig. 1 with the throttle half open, the equalizer N will operate to force fluid out of the broken ends of line C inasmuch as the air pressure in chamber Q' exerts a force through piston R on the fluid in chamber P', line P and up to the break in line C thus expelling the fluid to the atmosphere while at the same time the initial pressure derived from the chamber O' is effective in lines O and B to the right end of the receiver unit D and to the left end of the transmitter unit A. The piston E of unit A now moves to the right as fluid is forced from the right end of unit A through line C and discharged at the break in line C. Piston G in the receiver unit now moves to the left as the fluid between it and the resistor valve T operates to unseat the valve member 14 in a direction toward the break in line C. It being noted that the effective initial pressure from the equalizer N through the lines O and B to the right end of unit D is greater than the spring load on the valve 14 as well as greater than the spring load on the piston G of unit D. Thus at the instant of the brake in line C the lever H and link J operate to close the throttle and the pistons G and E, levers F and H, link J and throttle K are disposed in the approximate positions shown in dotted lines in Fig. 5. It is desirable, however, that the throttle be fully opened when a break occurs in the lines of the system inasmuch as a better control of the aircraft is afforded when the engine is thus controlled. Consequently the operator is now required to open a by-pass duct V in the master or transmitted unit A. As the transmitter unit is located within reach of the operator (pilot) he may readily open a valve W on said unit so that said duct will by-pass fluid around the piston E from the right end of the receiver D, line B and left end of the transmitter and through line C to the break in the latter, whereupon the spring L through the lever H and link J the throttle will be moved to the right into the fully open position also shown in full lines in Fig. 5. The spring L will move the piston G to the right in the manner above stated in that it will exert a force sufficient to pull a vacuum in the left end of the receiver unit between the valve member 14 of the valve T, which valve member is then closed and is exposed to atmospheric pressure on the side in which the break in line C has occurred. Thus it is seen that incident to the opening of the by-pass valve W to bleed line B to the atmosphere after the break in line C has occurred, the spring L will move the piston G of the receiver unit to the right and fully open the throttle K. It should be noted that the by-pass arrangement (duct V and valve W) is provided in both units for synchronizing the system as is customary in this art, and that the by-pass of unit A serves the additional function next above noted.

In the event line B breaks, the initial pressure in the system becomes immediately effective in lines P and C to move the piston G of the receiver to the right and fully open the throttle K assisted by the spring L while piston E is moved to the left. The fluid between the piston G and the break in line B and between piston E and said break will be freely discharged at the break. The initial pressure in line C at the time of the break in line B will be sufficient to unseat the valve member 14 of valve T and thus move the piston G to the right since atmospheric pressure is effective on the receiver side of valve member 14 when the break in line B occurs. Should the throttle fail to move into fully open position, the operator may move the transmitter piston E to the right and thus transmit pressure fluid through the intact line C to the left end of the receiver unit D and thus move piston G to the right and open the throttle.

Should both lines B and C break the spring L will operate to move the throttle into fully open position since it has enough force to move the piston G to the right while pulling a vacuum between said piston and the closed valve member 14 of valve T and in consideration of the fact that the valve 14 is exposed to atmospheric pressure on the side in which the break in the line C has occurred.

While the emergency operation has been described as taking place when the pistons of the transmitter and receiver units are in mid position, it is obvious that these same emergency operations will take place with the pistons in any position, except that should line B become broken or both lines become broken when the system has been operated to hold the throttle in fully open position, in both these events it will be apparent that the throttle will remain in fully open position as the break in line B or a break in both lines at such time will not cause any movement of the pistons of the transmitter and receiver units.

It will now be apparent that I have provided a closed hydraulic system in which by reason of being under an initial pressure when static and including safety means hereinbefore described, will operate through a cooperative action of all of the parts of elements thereof to provide the objects and advantages hereinbefore noted in a particularly efficacious manner whether the system is applied for engine throttle operation or for operation of any control element in which it is desired to assure a critical predetermined positioning of said element in the event of a break or breaks in the fluid lines.

It should be noted that the resistor valve embodied in this invention can be used to advantage to prevent creeping of the pistons in any closed hydraulic system wherein the receiver unit is operatively connected with a spring loaded control element, whether or not the pressurized equalizer and the by-pass valve are present in the system and regardless of any safety operations of the system in case of breaking of a line or both lines thereof. However, the presence in the system of the pressurized equalizer and the by-pass valve as here shown renders the system accurately and more positively and quickly operable to move the control element into a desired position in case of breaking of a fluid line or lines.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a pulsator system for actuating a spring loaded control element, a transmitter unit including a cylinder and piston assembly and a means for reciprocating said piston; a receiver unit including a cylinder and piston assembly in which the piston is adapted for operative connection with said control element so that the spring load thereon is imposed on said piston, fluid lines connecting the cylinders of said units so that the receiver piston will move responsive to movement of said transmitter piston; a tubular valve body member connected in one of said lines, an annular elastic valve seat of circular cross section mounted in the bore of said body member, a valve member movable from a seated position within said seat in either direction to open the bore of said body member to the passage of fluid therethrough, and a pair of springs mounted in said body member for holding the valve member seated against forces externally applied to said receiver piston when the transmitter unit is not in operation and arranged so that one or the other will yield and allow the valve to open when the transmitter unit is operated to force fluid through said one line in one direction or the other.

2. In a pulsator system for actuating a spring loaded control element, a transmitter unit including a cylinder and piston assembly and a means for reciprocating said piston; a receiver unit including a cylinder and piston assembly in which the piston is adapted for operative connection with said control element so that the spring load thereon is imposed on said piston, fluid lines connecting the cylinders of said units so that the receiver piston will move responsive to movement of said transmitter piston; a tubular valve body member connected in one of said lines, a valve seat mounted in the bore of said body member, a valve member movable from a seated position in either direction to open the bore of said body member to the passage of fluid therethrough, and a pair of springs mounted in said body member for holding the valve member seated against forces externally applied to said receiver piston when the transmitter unit is not in operation and arranged so that one or the other will yield and allow the valve to open when the transmitter unit is operated to force fluid through said one line in one direction or the other.

ARTHUR E. KREMILLER.

REFERENCES CITED

The following references are of record in the file of this patent:

UNITED STATES PATENTS

| Number    | Name      | Date          |
|-----------|-----------|---------------|
| 1,087,890 | Rogers    | Feb. 17, 1914 |
| 2,372,189 | Dougherty | Mar. 27, 1945 |
| 2,397,270 | Kelly     | Mar. 26, 1946 |